(12) United States Patent
Snyder et al.

(10) Patent No.: US 12,454,912 B2
(45) Date of Patent: Oct. 28, 2025

(54) SUPPLEMENTAL THRUST SYSTEM FOR A GAS TURBINE ENGINE

(71) Applicant: Raytheon Technologies Corporation, Farmington, CT (US)

(72) Inventors: Timothy S. Snyder, Glastonbury, CT (US); Randolph T. Lyda, Tequesta, FL (US)

(73) Assignee: RTX CORPORATION, Farmington, CT (US)

( * ) Notice: Subject to any disclaimer, the term of this patent is extended or adjusted under 35 U.S.C. 154(b) by 57 days.

(21) Appl. No.: 17/110,619

(22) Filed: Dec. 3, 2020

(65) Prior Publication Data

US 2022/0178305 A1 Jun. 9, 2022

(51) Int. Cl.
*F02C 7/00* (2006.01)
*F02C 7/22* (2006.01)

(52) U.S. Cl.
CPC ............ *F02C 7/22* (2013.01); *F05D 2220/32* (2013.01); *F05D 2240/35* (2013.01)

(58) Field of Classification Search
None
See application file for complete search history.

(56) References Cited

U.S. PATENT DOCUMENTS

| | | | | |
|---|---|---|---|---|
| 2,672,726 A | * | 3/1954 | Wolf | F02C 3/36 60/225 |
| 2,673,445 A | * | 3/1954 | Bruckmann | F02K 9/52 60/225 |
| 2,979,293 A | | 4/1961 | Mount | |
| 2,979,899 A | * | 4/1961 | Salmon | F23R 3/20 60/749 |
| 3,040,518 A | * | 6/1962 | Randolph | F02K 9/78 60/39.461 |
| 3,338,051 A | * | 8/1967 | Volpi | F23R 3/346 60/226.1 |
| 3,528,250 A | * | 9/1970 | Douglas | F28D 7/1615 60/762 |
| 3,934,409 A | * | 1/1976 | Quillevere | F23R 3/34 60/749 |
| 4,707,981 A | * | 11/1987 | Wagner | F02K 9/82 239/265.17 |
| 4,825,640 A | | 5/1989 | Shekleton | |
| 4,896,501 A | * | 1/1990 | Faulkner | F02K 3/11 60/264 |
| 5,001,896 A | * | 3/1991 | Hilt | F23R 3/48 60/39.821 |

(Continued)

FOREIGN PATENT DOCUMENTS

JP 0719481 1/1995

*Primary Examiner* — Edwin Kang
(74) *Attorney, Agent, or Firm* — Getz Balich LLC

(57) ABSTRACT

An assembly is provided for a turbine engine. This turbine engine assembly includes a flowpath duct, a fuel injector assembly and a secondary duct. The flowpath duct includes a flowpath. The fuel injector assembly includes an inner flow passage. The fuel injector assembly is configured to mix fuel with first gas within the inner flow passage to provide a fuel-gas mixture. The fuel injector assembly is configured to direct a jet of the fuel-gas mixture into the flowpath. The secondary duct is configured to direct second gas into the flowpath about the jet of the fuel-gas mixture.

12 Claims, 10 Drawing Sheets

(56) References Cited

U.S. PATENT DOCUMENTS

| | | | |
|---|---|---|---|
| 5,003,766 A * | 4/1991 | Paul | F02C 6/003 60/39.15 |
| 5,317,864 A | 6/1994 | Shorb | |
| 5,341,640 A | 8/1994 | Faulkner | |
| 5,727,378 A | 3/1998 | Seymour | |
| 6,510,684 B2 | 1/2003 | Matsunaga | |
| 6,895,756 B2 | 5/2005 | Schmotolocha | |
| 6,931,862 B2 | 8/2005 | Harris | |
| 7,448,199 B2 | 11/2008 | Johnson | |
| 2002/0012588 A1 | 1/2002 | Matsunaga | |
| 2002/0184893 A1 * | 12/2002 | Farmer | F23R 3/06 60/804 |
| 2003/0000217 A1 * | 1/2003 | North | F23R 3/04 60/772 |
| 2007/0012042 A1 * | 1/2007 | Alkabie | F23R 3/283 60/740 |
| 2007/0234727 A1 * | 10/2007 | Patel | F23R 3/50 60/754 |
| 2010/0043440 A1 | 2/2010 | Heilos | |
| 2010/0122536 A1 * | 5/2010 | Nolcheff | F04D 29/687 60/751 |
| 2010/0223931 A1 * | 9/2010 | Chila | F23R 3/005 60/760 |
| 2010/0229564 A1 * | 9/2010 | Chila | F23R 3/06 60/752 |
| 2012/0304649 A1 * | 12/2012 | Matsuyama | F23R 3/286 60/737 |
| 2015/0275762 A1 | 10/2015 | Kenyon | |
| 2016/0017755 A1 * | 1/2016 | Low | F02C 3/04 60/805 |
| 2016/0160668 A1 * | 6/2016 | Eastwood | F01D 25/243 60/722 |
| 2017/0159936 A1 * | 6/2017 | Cunha | F23R 3/002 |
| 2018/0112878 A1 * | 4/2018 | Pacheco-Tougas | F23R 3/60 |
| 2018/0313540 A1 * | 11/2018 | Nagaraja | F23R 3/286 |
| 2019/0024895 A1 * | 1/2019 | Stickles | F23R 3/045 |
| 2019/0368381 A1 | 12/2019 | Greenwood | |
| 2020/0109663 A1 | 4/2020 | Binek | |

\* cited by examiner

SUPPLEMENTAL THRUST SYSTEM FOR A GAS TURBINE ENGINE

BACKGROUND OF THE DISCLOSURE

1. Technical Field

This disclosure relates generally to a gas turbine engine and, more particularly, to a supplemental thrust system for a gas turbine engine.

2. Background Information

A gas turbine engine includes a compressor section, a combustor section, a turbine section and an exhaust section. During operation, the compressor section compresses air to provide compressed air to the combustor section. The combustor section mixes the compressed air with fuel to provide a fuel-air mixture. This fuel-air mixture is ignited within the combustor section, and combustion products thereof flow through the turbine section causing a rotor within the turbine section to drive rotation of a rotor in the compressor section. The combustion products are subsequently directed out of the gas turbine engine through the exhaust section to provide forward engine thrust.

Additional forward engine thrust may be desirable for certain maneuvers and/or under certain operating conditions. Such additional forward engine thrust may be provided by a supplemental thrust system. The supplemental thrust system introduces additional fuel into the combustion products flowing through the exhaust section for combustion and, thus, production of additional combustion products for generating additional forward engine thrust. While various types and configurations of supplemental thrust systems are known in the art, there is still room in the art for improvement.

SUMMARY OF THE DISCLOSURE

According to an aspect of the present disclosure, an assembly is provided for a turbine engine. This turbine engine assembly includes a flowpath duct, a fuel injector assembly and a secondary duct. The flowpath duct includes a flowpath. The fuel injector assembly includes an inner flow passage. The fuel injector assembly is configured to mix fuel with first gas within the inner flow passage to provide a fuel-gas mixture. The fuel injector assembly is configured to direct a jet of the fuel-gas mixture into the flowpath. The secondary duct is configured to direct second gas into the flowpath about the jet of the fuel-gas mixture.

According to another aspect of the present disclosure, another assembly is provided for a turbine engine. This turbine engine assembly includes a flowpath duct and a fuel injector. The flowpath duct includes a flowpath. The fuel injector assembly includes an inner flow passage. The fuel injector assembly is configured receive first gas from a first gas source, receive second gas from a second gas source, and mix fuel with the first gas and the second gas within the inner flow passage to provide a fuel-gas mixture. The fuel injector assembly is configured to direct a jet of the fuel-gas mixture into the flowpath.

According to still another aspect of the present disclosure, another assembly is provided for a turbine engine. This turbine engine assembly includes a flowpath duct, a protrusion and a fuel injector. The flowpath duct includes a flowpath. The protrusion is connected to the flowpath duct and projects radially into the flowpath towards a centerline of the flowpath duct. The fuel injector assembly includes an inner flow passage. The fuel injector assembly is configured to inject fuel into the inner flow passage for mixing with first gas within the inner flow passage to provide a fuel-gas mixture. The fuel injector assembly is configured to direct a jet of the fuel-gas mixture into the flowpath at a location downstream of and aligned with the protrusion.

The flowpath duct may be configured as or otherwise include an exhaust duct. The flowpath may be an exhaust flowpath.

The flowpath duct may be configured as or otherwise include an airflow duct. The flowpath may be an airflow flowpath such as, but not limited to, a bypass flowpath.

The first gas source may be configured as or otherwise include a combustion chamber within a combustor. The second gas source may be configured as or otherwise include a plenum in which the combustor is arranged.

The turbine engine assembly may also include a secondary duct configured to direct an additional quantity of the second gas into the flowpath as a flow that extends circumferentially about the jet of the fuel-gas mixture.

The turbine engine assembly may also include a secondary duct configured to direct second gas into the flowpath to shield the jet of the fuel-gas mixture entering the flowpath.

The secondary duct may include an outer flow passage that extends circumferentially about the inner flow passage.

The secondary duct may be configured to direct the second gas as an annular stream into the flowpath such that the annular stream of the second gas circumscribes the jet of the fuel-gas mixture.

The turbine engine assembly may also include a combustor including a combustion chamber. The fuel injector assembly may be configured to bleed the first gas from the combustion chamber.

The turbine engine assembly may also include a diffuser including a plenum. The combustor may be arranged within the plenum. The secondary duct may be configured to bleed the second gas from the plenum.

The fuel injector assembly may be configured to receive the first gas at a first pressure. The secondary duct may be configured to receive the second gas at a second pressure that is greater than the first pressure.

The fuel injector assembly may be configured to receive the first gas at a first temperature. The secondary duct may be configured to receive the second gas at a second temperature that is less than the first temperature.

The fuel injector assembly may be configured to direct the jet of the fuel-gas mixture into the flowpath as a sonic jet of the fuel-gas mixture.

The fuel injector assembly may be configured to bleed a portion of the second gas from the secondary duct. The fuel injector assembly may be configured to mix the portion of the second gas with the first gas and the fuel to provide the fuel-gas mixture.

The turbine engine assembly may also include a turbine section. The flowpath duct may be downstream of and may be fluidly coupled with the turbine section.

The turbine engine assembly may also include a first protrusion connected to the flowpath duct and projecting radially into the flowpath towards a centerline of the flowpath duct. The fuel injector assembly may be configured to direct the jet of the fuel-gas mixture into the flowpath at a first location that is circumferentially aligned with and downstream of the first protrusion.

The turbine engine assembly may also include a second protrusion, a second fuel injector assembly and a second secondary duct. The second protrusion may be connected to the flowpath duct and may project radially into the flowpath towards the centerline of the flowpath duct. The second fuel injector assembly may be configured to direct a second jet of a second fuel-gas mixture into the flowpath at a second location that is circumferentially aligned with and downstream of the second protrusion. The second secondary duct may be configured to direct the second gas into the flowpath about the second jet of the second fuel-gas mixture.

The turbine engine assembly may also include a center body between and connected to the first protrusion and the second protrusion.

The fuel injector assembly may be configured to inject the fuel into the inner flow passage at a choke point within the inner flow passage.

The fuel injector assembly may be configured to inject the fuel into the inner flow passage downstream of a choke point in the inner flow passage.

The present disclosure may include any one or more of the individual features disclosed above and/or below alone or in any combination thereof The foregoing features and the operation of the invention will become more apparent in light of the following description and the accompanying drawings.

DETAILED DESCRIPTION

Figure 1:
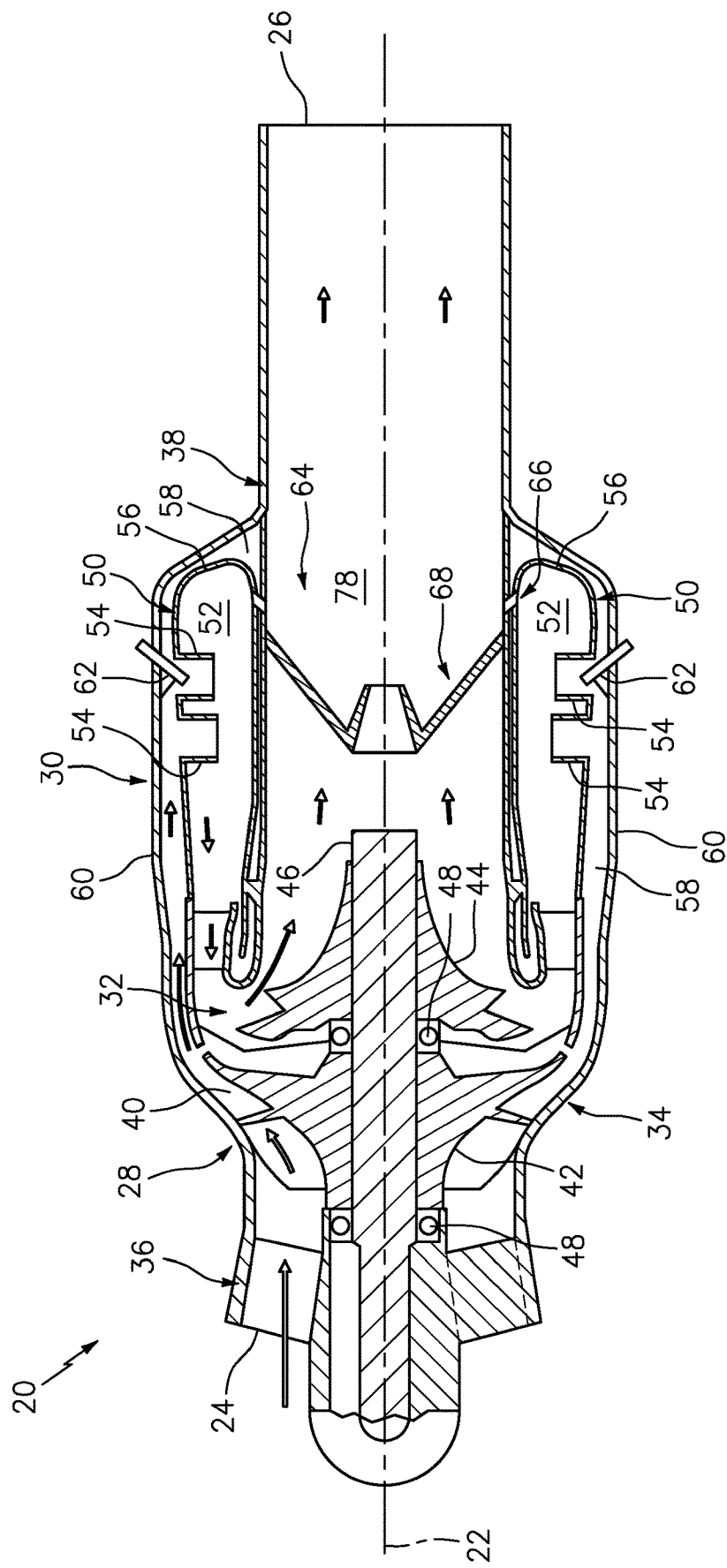
FIG. 1 is a side sectional schematic illustration of a gas turbine engine.

FIG. 1 is a side sectional illustration of a gas turbine engine 20. The gas turbine engine 20 of FIG. 1 is configured as a single spool, radial-flow turbojet turbine engine. This gas turbine engine 20 is configured for propelling an aircraft such as, but not limited to, an unmanned aerial vehicle (UAV), a drone or any other manned or unmanned aircraft or self-propelled projectile. The present disclosure, however, is not limited to such an exemplary turbojet turbine engine configuration.

The gas turbine engine 20 of FIG. 1 extends axially along an axial centerline 22 between a forward, upstream airflow inlet 24 and an aft, downstream airflow exhaust 26. This axial centerline 22 may also be a rotational axis for various components within the gas turbine engine 20.

The gas turbine engine 20 includes a compressor section 28, a combustor section 30 and a turbine section 32. The gas turbine engine 20 also includes a static engine structure 34. This static engine structure 34 houses the compressor section 28, the combustor section 30 and the turbine section 32. The static engine structure 34 of FIG. 1 also forms an inlet section 36 and an exhaust section 38 for the gas turbine engine 20, where the inlet section 36 forms the airflow inlet 24 and the exhaust section 38 forms the airflow exhaust 26.

The engine sections 36, 28, 30, 32 and 38 are arranged sequentially along a core flowpath 40 that extends through the gas turbine engine 20 from the airflow inlet 24 to the airflow exhaust 26. Each of the engine sections 28 and 32 includes a respective rotor 42 and 44. Each of these rotors 42 and 44 includes a plurality of rotor blades arranged circumferentially around and connected to at least one respective rotor disk. The rotor blades, for example, may be formed integral with or mechanically fastened, welded, brazed, adhered and/or otherwise attached to the respective rotor disk(s).

The compressor rotor 42 may be configured as a radial flow rotor. The turbine rotor 44 may also or alternatively be configured as a radial flow rotor. The compressor rotor 42 is connected to the turbine rotor 44 through a shaft 46. This shaft 46 is rotatably supported by the static engine structure 34 through a plurality of bearings 48; e.g., rolling element bearings, journal bearings, etc.

The combustor section 30 includes an annular combustor 50 with an annular combustion chamber 52. The combustor 50 of FIG. 1 is configured as a reverse flow combustor. Inlets ports/flow tubes 54 into the combustion chamber 52, for example, may be arranged at (e.g., on, adjacent or proximate) and/or towards an aft bulkhead wall 56 of the combustor 50. An outlet from the combustor 50 may be arranged axially aft of an inlet to the turbine section 32. The combustor 50 may also be arranged radially outboard of and/or axially overlap at least a (e.g., aft) portion of the turbine section 32. With this arrangement, the core flowpath 40 of FIG. 1 reverses its directions (e.g., from a forward-to-aft direction to an aft-to-forward direction) a first time as the flowpath 40 extends from a diffuser plenum 58 surrounding the combustor 50 into the combustion chamber 52. The core flowpath 40 of FIG. 1 then reverses its direction (e.g., from the aft-to-forward direction to the forward-to-aft direction) a second time as the flowpath 40 extends from the combustion chamber 52 into the turbine section 32.

During operation, air enters the gas turbine engine 20 through the inlet section 36 and its airflow inlet 24. The inlet section 36 directs this air from the airflow inlet 24 into the core flowpath 40 and the compressor section 28. The air within the core flowpath 40 may be referred to as core air.

The core air is compressed by the compressor rotor 42 and directed through a diffuser 60 and its plenum 58 into the combustion chamber 52. Fuel is injected via one or more fuel injectors 62 and mixed with the compressed core air to provide a fuel-air mixture. This fuel-air mixture is ignited within the combustion chamber 52 via an igniter (not shown), and combustion products thereof flow through the turbine section 32 and cause the turbine rotor 44 to rotate.

This rotation of the turbine rotor 44 drives rotation of the compressor rotor 42 and, thus, compression of the air received from the airflow inlet 24. The exhaust section 38 receives the combustion products from the turbine section 32. The exhaust section 38 directs the received combustion products out of the gas turbine engine 20 to provide forward engine thrust.

Additional forward engine thrust may be desirable for certain maneuvers and/or under certain operating conditions. The gas turbine engine 20 of FIG. 1 therefore includes a supplemental thrust system 64. This supplemental thrust system 64 includes a supplemental fuel injection system 66. The supplemental thrust system 64 of FIG. 1 also includes a supplemental thrust stabilization system 68.

Figure 2:
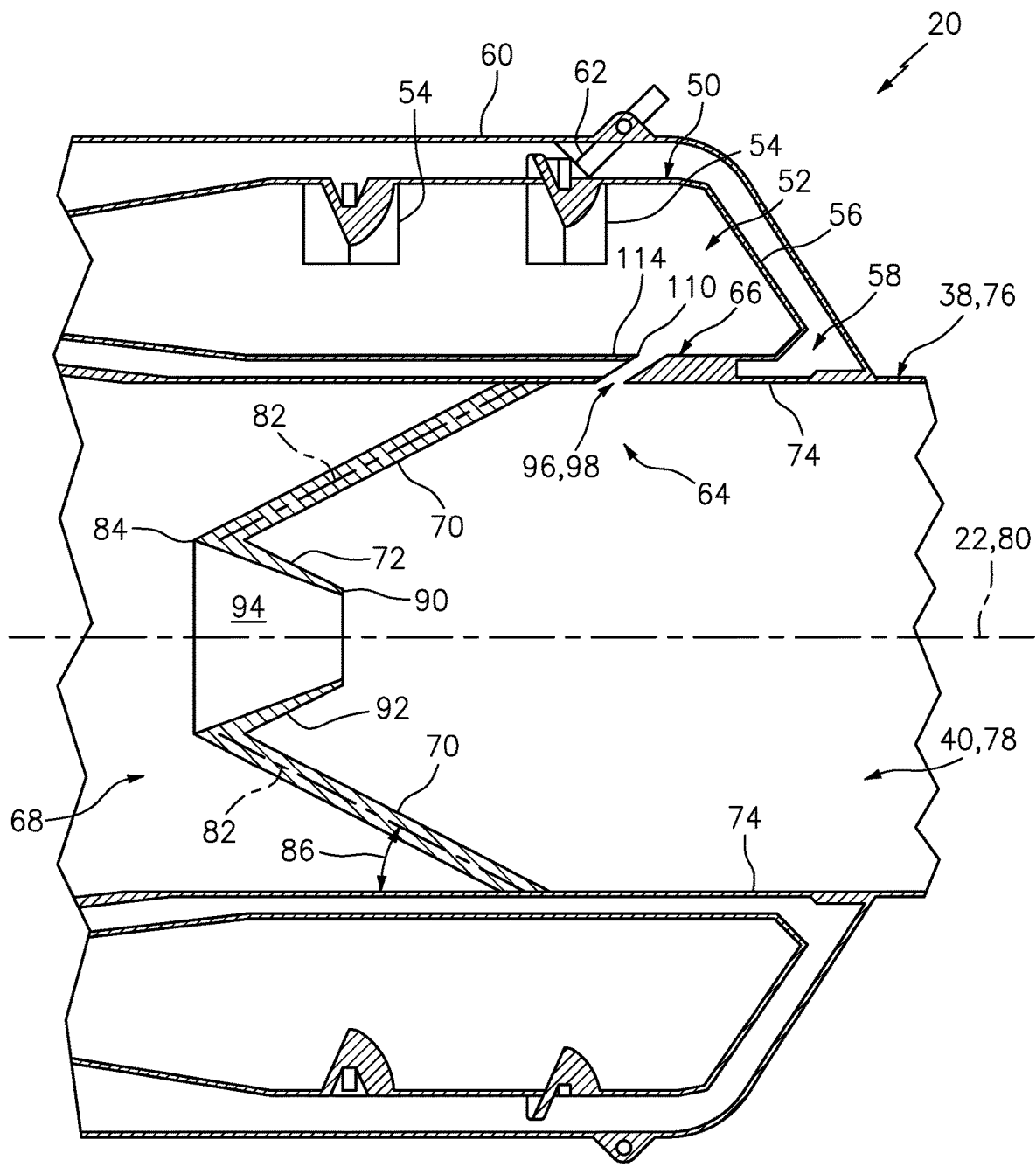
FIG. 2 is a side sectional illustration of a portion of the gas turbine engine.
Figure 3:
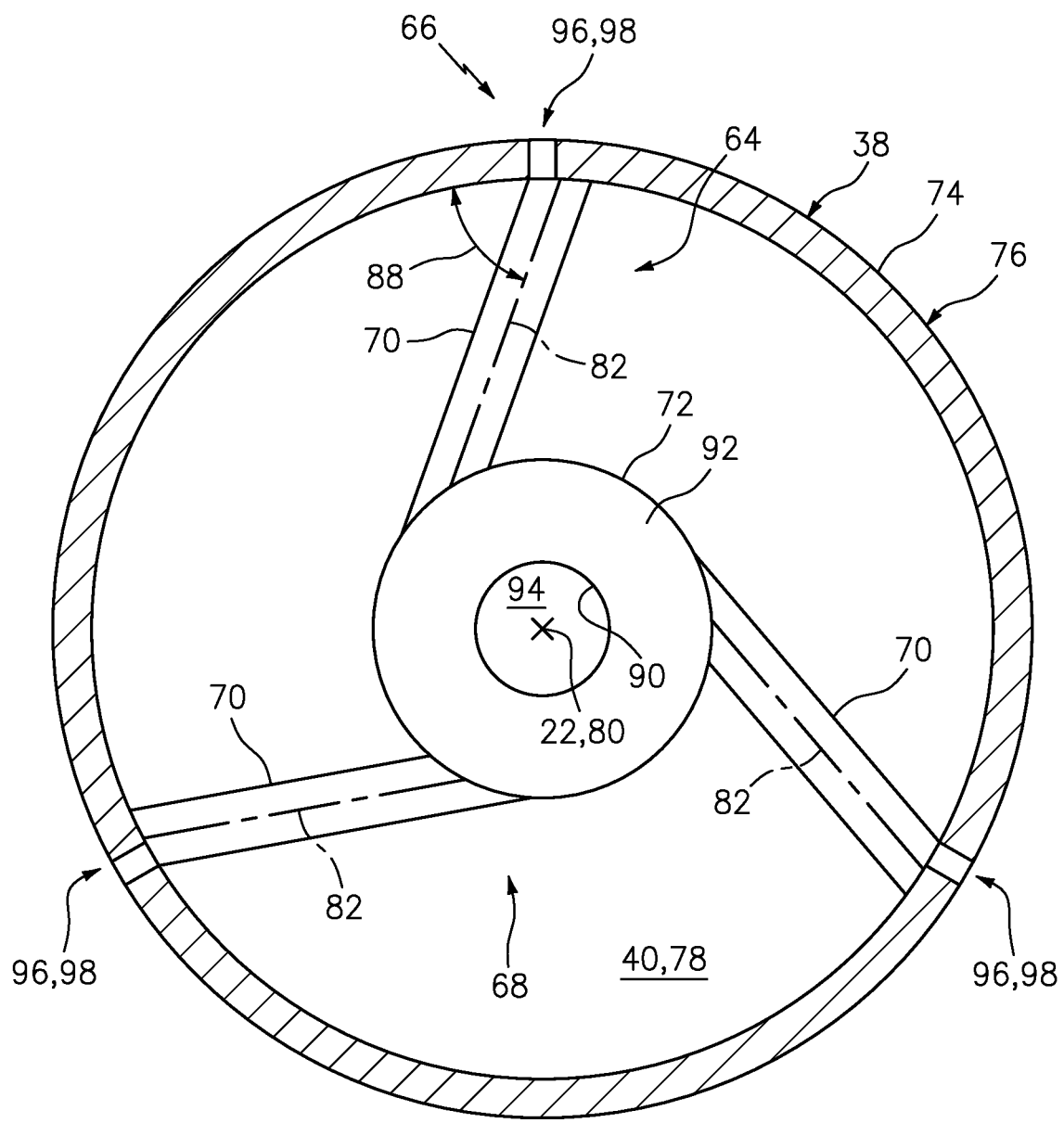
FIG. 3 is a cross-sectional schematic illustration of an exhaust section.

Referring to FIGS. 2 and 3, the thrust stabilization system 68 includes one or more protrusions 70. The thrust stabilization system 68 of FIGS. 2 and 3 also includes a center body 72.

Each of the protrusions 70 may be configured as a strut and/or a vane. Each protrusion 70 is connected to a (e.g., tubular) sidewall 74 of an exhaust duct 76 in the exhaust section 38, and is arranged within an exhaust flowpath 78. This exhaust flowpath 78 is a portion of the core flowpath 40 that is formed by and is within the exhaust duct 76, and extends longitudinally through the exhaust duct 76 along a longitudinal centerline 80, where at least a portion or an entirety of the longitudinal centerline 80 may be parallel (e.g., coaxial) with the axial centerline 22. Each protrusion 70 of FIGS. 2 and 3, for example, projects radially inward from the exhaust duct sidewall 74 towards the centerline 22, 80. More particularly, each protrusion 70 of FIGS. 2 and 3 extends radially inward along a respective protrusion centerline 82 from the exhaust duct sidewall 74 to an outer periphery of the center body 72 at, for example, a first (e.g., forward and/or upstream) end 84 of the center body 72. Each protrusion 70 is connected to the center body 72. The protrusions 70 are thereby configured to locate and support the center body 72 within the exhaust flowpath 78.

Figure 7:
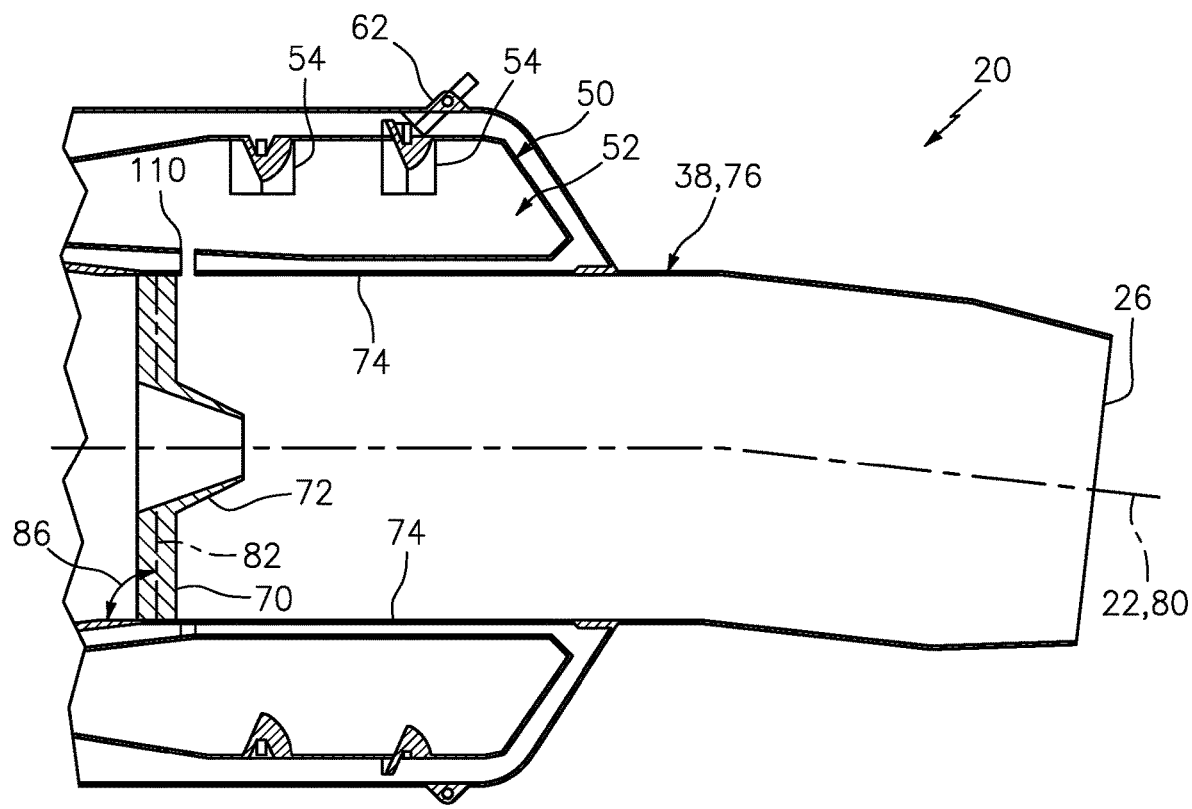
FIG. 7 is a side sectional illustration of an aft portion of the gas turbine engine configured with another supplemental thrust system and a tapered exhaust duct.

Referring to FIG. 2, the protrusion 70 and its centerline 82 may be angularly offset from the exhaust duct sidewall 74 (e.g., at least at a point where that protrusion 70 is connected to the exhaust duct 76) by an included angle 86 when viewed, for example, in a side sectional plane parallel with and/or coincident with the centerline 22, 80. This angle 86 may be an acute angle. The angle 86, for example, may be between twenty degrees (20°) and seventy degrees (70°); e.g., about (+/−2°) or exactly thirty degrees (30°). With such a configuration, the protrusion 70 and its centerline 82 may also be angularly offset from the centerline 22, 80 in the side sectional plane by, for example, the same or another acute angle. The present disclosure, however, is not limited to the foregoing exemplary angle. In other embodiments, for example, the angle 86 may be ninety degrees (90°) such that the protrusion 70 and its centerline 82 are arranged perpendicular to the exhaust duct sidewall 74 in the side sectional plane as shown (e.g., see FIG. 7).

Referring to FIG. 3, the protrusion 70 and its centerline 82 may also or alternatively be angularly offset from the exhaust duct sidewall 74 (e.g., at least at the point where that protrusion 70 is connected to the exhaust duct 76) by an included angle 88 when viewed, for example, in a cross-sectional plane perpendicular to the centerline 22, 80. This angle 88 may be an acute angle. The angle 88, for example, may be between sixty degrees (60°) and eighty degrees (80°). The present disclosure, however, is not limited to the foregoing exemplary angle. In other embodiments, for example, the angle 88 may be ninety degrees (90°) such that the protrusion 70 and its centerline 82 are arranged perpendicular to the exhaust duct sidewall 74 in the cross-sectional plane.

The center body 72 of FIGS. 2 and 3 is configured as a tubular (e.g., frustoconical) body. The center body 72 of FIG. 2 extends along the centerline 22, 80 between its first end 84 and a second (e.g., aft and/or downstream) end 90 of the center body 72. An outer surface 92 of the center body 72 may radially taper inwards towards the centerline 22, 80 as the center body 72 extends from the center body first end 84 to the center body second end 90. The center body 72 of FIGS. 2 and 3 is configured with an inner bore 94. This inner bore 94 extends along the centerline 22, 80 through (or into) the center body 72. Of course, in other embodiments, the center body 72 may be configured without an inner bore and/or with an alternative geometry outer surface. The present disclosure therefore is not limited to the foregoing exemplary center body configuration.

The fuel injection system 66 of FIGS. 2 and 3 includes one or more fuel-gas injectors 96. These fuel-gas injectors 96 are arranged circumferentially about the centerline 22, 80 in an annular array.

Figure 4:
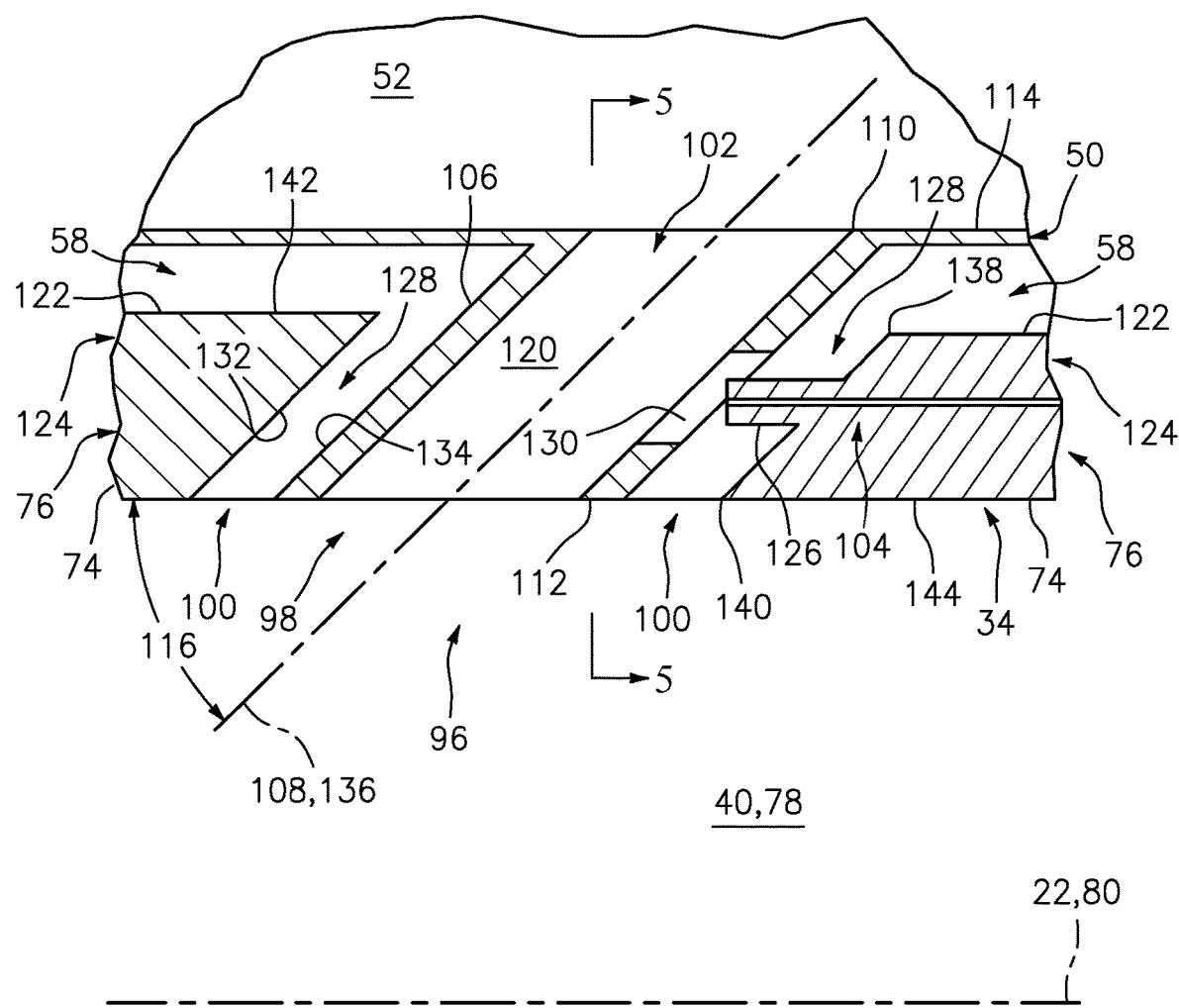
FIG. 4 is a side sectional illustration of a portion of a fuel injection system for a supplemental thrust system.

Referring to FIG. 4, each of the fuel-gas injectors 96 is arranged in and/or otherwise with the static engine structure 34 along the exhaust duct 76 and its sidewall 74. Each fuel-gas injector 96 of FIG. 4, for example, is arranged radially between the exhaust flowpath 78 and the combustion chamber 52.

Each fuel-gas injector 96 includes a fuel injector assembly 98; e.g., a radial flow injector assembly. Each fuel-gas injector 96 of FIG. 4 also includes a secondary (e.g., outer, shielding air and/or buffer air) duct 100; e.g., a radial flow secondary duct.

The fuel injector assembly 98 of FIG. 4 includes a primary (e.g., inner) duct 102 and a fuel injector 104. The primary duct 102 is configured as a (e.g., cylindrical) tubular body. The primary duct 102 of FIG. 4, for example, has a primary duct sidewall 106 that extends circumferentially about (e.g., completely around) a centerline 108 of that primary duct 102, which primary duct centerline 108 may be straight or non-straight (e.g., curved, splined, etc.). The primary duct 102 extends along its centerline 108 from a first (e.g., radial outer and/or upstream) end 110 of the primary duct 102 to a second (e.g., radial inner and/or downstream) end 112 of the primary duct 102. The primary duct first end 110 may be aligned with, connected to and/or integrated with an (e.g., tubular) inner sidewall 114 of the combustor 50. Thus, an inlet orifice to the primary duct 102 may be formed by and/or at an opening in the combustor inner sidewall 114. The primary duct second end 112 may be aligned with, connected to and/or integrated with the exhaust duct sidewall 74. Thus, an outlet orifice to the primary duct 102 (e.g., a nozzle orifice for the fuel injector assembly 98) may be formed by and/or at an opening in the exhaust duct sidewall 74.

Figure 8:
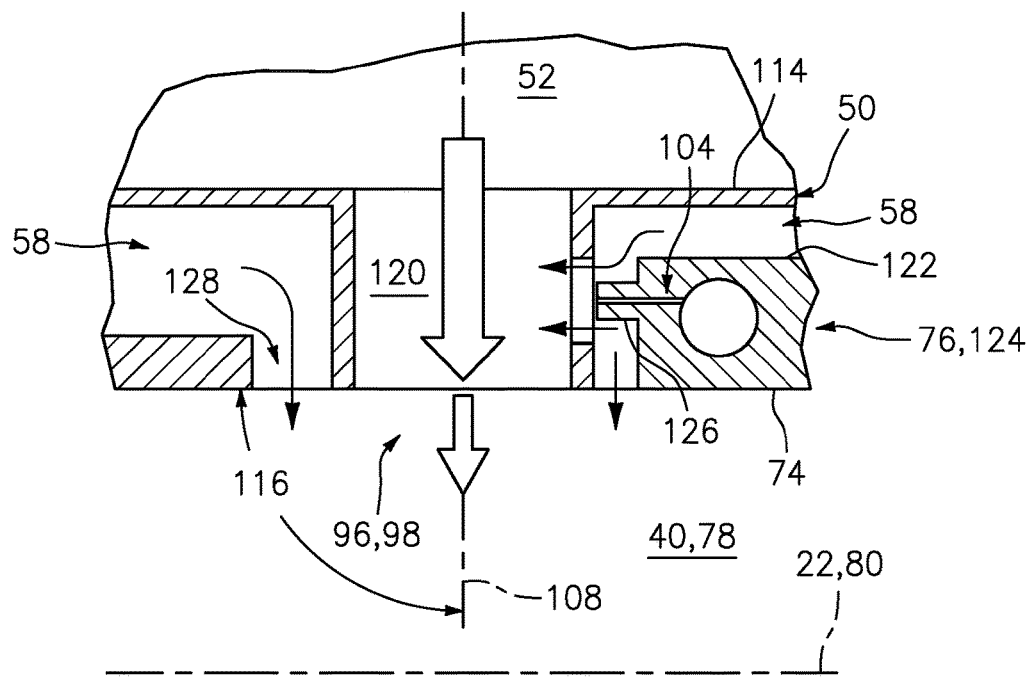
FIG. 8 is a side sectional illustration of a portion of another fuel injection system.

The primary duct 102 and its centerline 108 may be angularly offset from the exhaust duct sidewall 74 (e.g., at least at the primary duct second end 112) by an included angle 116 when viewed, for example, in a side sectional plane parallel with and/or coincident with the centerline 22, 80. This angle 116 may be an acute angle. The angle 116, for example, may be between twenty degrees (20°) and seventy degrees (70°); e.g., about (+/−2°) or exactly thirty degrees (30°). With such a configuration, the primary duct 102 and its centerline 108 may also be angularly offset from the centerline 22, 80 in the side sectional plane (see FIG. 2) by, for example, the same or another acute angle. The present disclosure, however, is not limited to the foregoing exemplary angle. In other embodiments, for example, the angle 116 may be ninety degrees (90°) such that the primary duct 102 and its centerline 108 are arranged perpendicular to the exhaust duct sidewall 74 in the side sectional plane (e.g., see FIG. 8).

Figure 5:
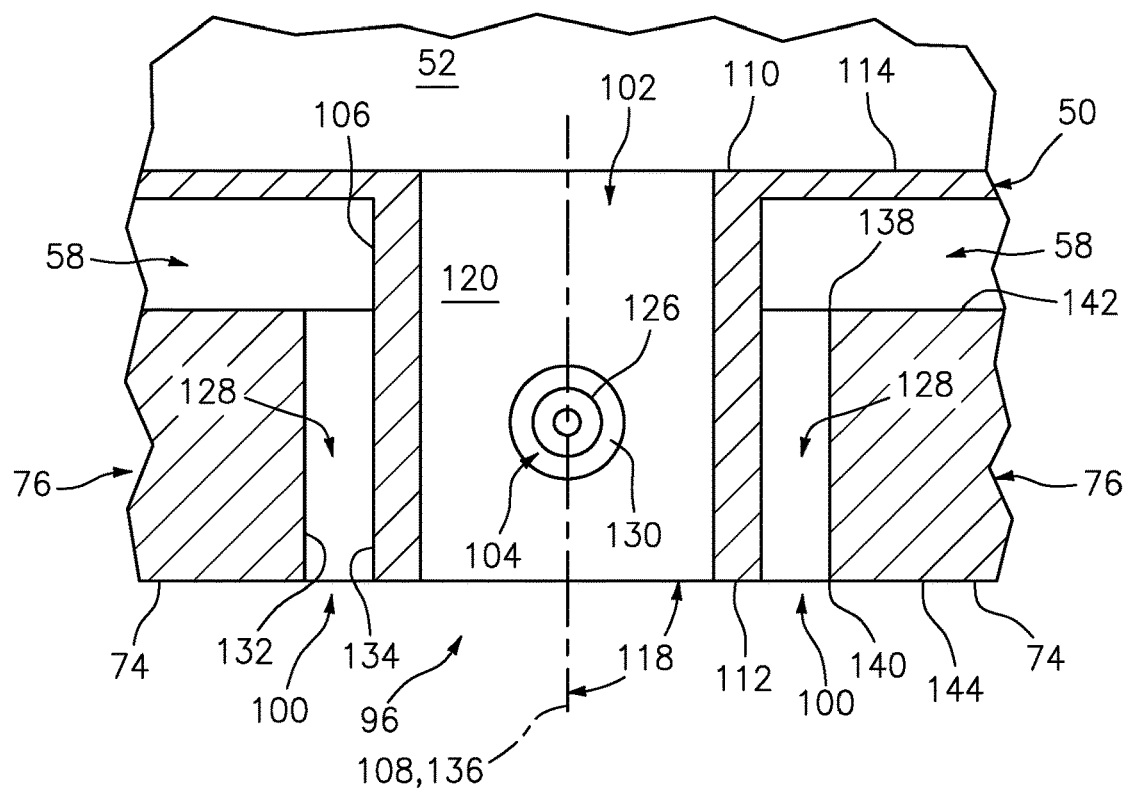
FIG. 5 is a sectional illustration of the fuel injection system taken along line 5-5 in FIG. 4.

Referring to FIG. 5, the primary duct 102 and its centerline 108 may be angularly offset from (e.g., perpendicular to) the exhaust duct sidewall 74 (e.g., at least at the primary duct second end 112) by an included angle 118 when viewed, for example, in a cross-sectional plane perpendicular to the centerline 22, 80. This angle 118 may be a right angle (90°) such that, for example, the primary duct centerline 108 is also perpendicular to and/or coincident with the centerline 22, 80. The present disclosure, however, is not limited to the foregoing exemplary angle. In other embodiments, for example, the angle 118 may be an acute angle.

Referring to FIG. 4, the primary duct 102 has an inner bore which forms an inner flow passage 120 of the fuel injector assembly 98. This inner flow passage 120 extends along the primary duct centerline 108 from the primary duct first end 110 to the primary duct second end 112 with, for example, a uniform (constant) lateral width; e.g., diameter. The inner flow passage 120 thereby fluidly couples the combustion chamber 52 with the exhaust flowpath 78.

The fuel injector 104 may be configured with (e.g., integrated with) the static engine structure 34. The fuel injector 104 of FIG. 4, for example, is configured as an integral part of the exhaust duct sidewall 74. The fuel injector 104 may also be configured as an integral part of a sidewall 122 of a diffuser case 124 that is radially adjacent the exhaust duct sidewall 74, which diffuser case sidewall 122 at least partially forms the diffuser plenum 58 about the combustor 50; see also FIG. 2.

The fuel injector 104 of FIG. 4 includes a tubular nozzle head 126. This nozzle head 126 projects out from a base of the fuel injector 104 through an (e.g., annular) outer flow passage 128 and partially into (or through) an aperture 130 (e.g., a through-hole) in the primary duct sidewall 106. The nozzle head 126 is thereby configured to direct fuel into the inner flow passage 120.

The secondary duct 100 may be defined by a portion of the static engine structure 34 (e.g., the exhaust duct sidewall 74 and/or the diffuser case sidewall 122) which radially separates the exhaust flowpath 78 from the diffuser plenum 58. This secondary duct 100 has an inner bore in which the primary duct 102 is arranged. With this configuration, an (e.g., tubular) inner surface 132 of the secondary duct 100 and an (e.g., tubular) outer surface 134 of the primary duct 102 may collectively form the outer flow passage 128 radially between the ducts 100 and 102. This outer flow passage 128 extends circumferentially about (e.g., completely around, circumscribes) the primary duct 102 and its inner flow passage 120. The outer flow passage 128 extends along a centerline 136 of the secondary duct 100 from a first (e.g., radial outer and/or upstream) end 138 of the secondary duct 100 to a second (e.g., radial inner and/or downstream) end 140 of the secondary duct 100, where the secondary duct centerline 136 may be parallel with and/or coaxial with the primary duct centerline 108. The secondary duct first end 138 may be located at a surface 142 of the static engine structure 34 (e.g., the exhaust duct sidewall 74) that forms a peripheral boundary of the diffuser plenum 58. The secondary duct second end 140 may be located at a surface 144 of the static engine structure 34 (e.g., the exhaust duct sidewall 74) that forms a peripheral boundary of the exhaust flowpath 78. The outer flow passage 128 thereby fluidly couples the diffuser plenum 58 with the exhaust flowpath 78. Thus, the outer flow passage 128 may use the same airflow that cools the combustor wall (e.g., a combustor liner) to cool the sidewall of the primary duct 102.

The outer flow passage 128 may also be fluidly coupled to the inner flow passage 120. The outer flow passage 128 of FIG. 4, for example, is fluidly coupled to the inner flow passage 120 through the aperture 130 in the primary duct sidewall 106. The aperture 130 is arranged with/surrounds the nozzle head 126 such that fuel directed out from the fuel injector 104 passes through the aperture 130 and mixes with hot combustion gas from the combustion chamber 52.

Referring to FIG. 2, each fuel injector assembly 98 is arranged axially/longitudinally downstream of a respective one of the protrusions 70 along the centerline 22, 80. Referring to FIG. 3, each fuel injector assembly 98 is laterally (e.g., circumferentially) aligned with the respective protrusion 70 about the centerline 22, 80.

Figure 6:
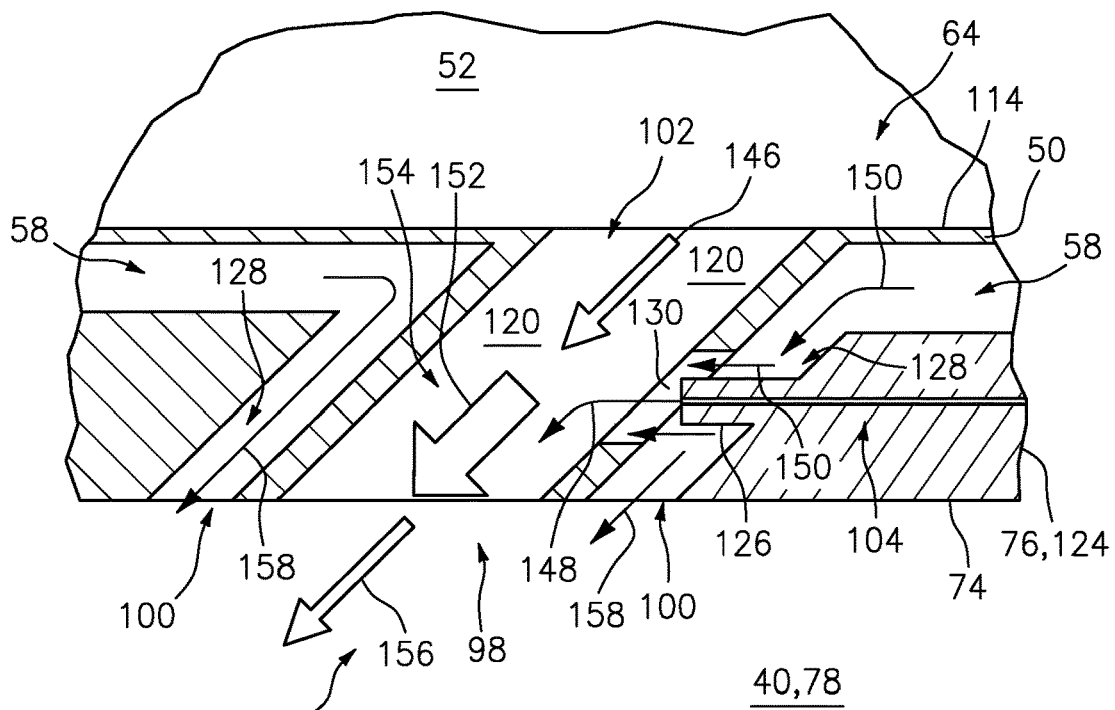
FIG. 6 is another side sectional illustration of a portion of the fuel injection system depicted with fuel and gas flow arrows.

During supplemental thrust system 64 operation, referring to FIG. 6, the inner flow passage 120 bleeds and thereby receives first gas 146 (e.g., a mixture of fuel and compressed air and/or combustion products) from the combustion chamber 52. The fuel injector 104 injects fuel 148 into the inner flow passage 120 at an injection point. Upon entering the relatively hot and high pressure first gas stream within the inner flow passage 120, the fuel 148 injected by the fuel injector 104 may flash vaporize and mixes with the first gas 146. Second gas 150 (e.g., compressed air from the diffuser plenum 58) may also be mixed with the fuel 148 and the first gas 146 at the injection point. The fuel 148, the first gas 146 and the second gas 150 mixed within the inner flow passage 120 provides a fuel-gas mixture 152. This fuel-gas mixture 152 may be accelerated into a sonic flow at a choke point 154 within the inner flow passage 120. This choke point 154 may be functionally defined at the injection point due to the addition of the fuel 148 and the second gas 150 introduced into the first gas flow; thus, an increase in mass flow within the inner flow passage 120. The fuel injector assembly 98 injects the sonic flow of the fuel-gas mixture 152 into the exhaust flowpath 78 as a sonic jet 156 of the fuel-gas mixture 152.

To increase penetration of the fuel-gas mixture jet 156 into the exhaust flowpath 78, the secondary duct 100 bleeds and thereby receives the second gas 150 from the diffuser plenum 58. A majority of this second gas 150 flows through the outer flow passage 128 and is injected into the exhaust flowpath 78 about the fuel-gas mixture jet 156. The second gas 150, for example, may be directed into the exhaust flowpath 78 as a (e.g., annular) stream 158 of the second gas 150, which second gas stream 158 extends circumferentially about (e.g., completely around, circumscribes) the fuel-gas mixture jet 156. The second gas stream 158 may thereby form a shielding/buffer flow about the fuel-gas mixture jet 156. The shielding/buffer flow may thereby enable the fuel-gas mixture jet 156 to penetrate deeper into the exhaust flowpath 78 and further away from the exhaust duct sidewall 74. The second gas stream 158 also provides additional oxygen for combustion of the fuel 148 within the fuel-gas mixture jet 156 and cools the sidewall of the primary duct 102.

Referring to FIG. 2, the center body 72 may accelerate diffusion of combustion products exiting the turbine section 32. Referring to FIG. 6, the fuel 148 and the gas from the jet 156 and the second gas 150 from the stream 158 mix with the (e.g., diffused) combustion products exiting the turbine section 32. This fuel-gas mixture 152 may be self-ignited by the hot combustor products in the exhaust flowpath 78 or may be ignited by an ignitor (not shown in FIG. 6) to provide additional combustion products, depending upon operating conditions for example. The additional combustion products are directed out of the gas turbine engine 20 through the airflow exhaust 26 to provide additional forward engine thrust (see FIG. 1).

In the embodiment of FIG. 6, the first gas 146 bled from the combustion chamber 52 and received by the inner flow passage 120 has a first gas temperature and a first gas pressure. The second gas 150 bled from the diffuser plenum 58 and received by the outer flow passage 128 has a second gas temperature and a second gas pressure. The second gas temperature is different (e.g., less) than the first gas temperature. The second gas pressure is different (e.g., greater) than the first gas pressure.

In some embodiments, referring to FIG. 2, the primary duct first end 110 may be located at (on, adjacent or proximate) an axially aft end and/or an upstream end of the combustor 50. The primary duct 102 may thereby bleed the first gas 146 from a relative cool temperature zone within the combustion chamber 52. In other embodiments, referring to FIG. 7, the primary duct first end 110 may be located within an intermediate region along the combustor 50. The primary duct first end 110, for example, may be slightly axially forward of and/or downstream of the flow tubes 54. The primary duct 102 may thereby bleed the first gas 146 from a relatively hot (e.g., a hottest) temperature zone within the combustion chamber 52.

Figure 9:
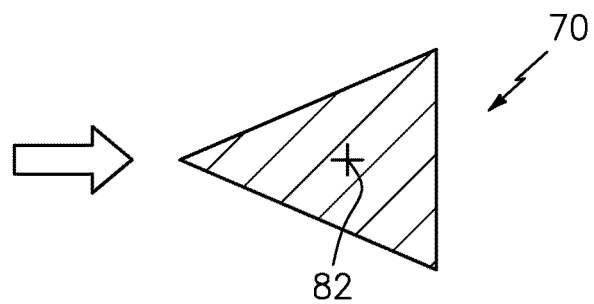
FIG. 9 is a cross-sectional illustration of a protrusion for a supplemental thrust stabilization system.

In some embodiments, referring to FIG. 9, one or more or each of the protrusions 70 may have a triangular and/or V-shaped cross-sectional geometry when viewed, for example, in a plane perpendicular to its protrusion centerline 82.

Figure 10:
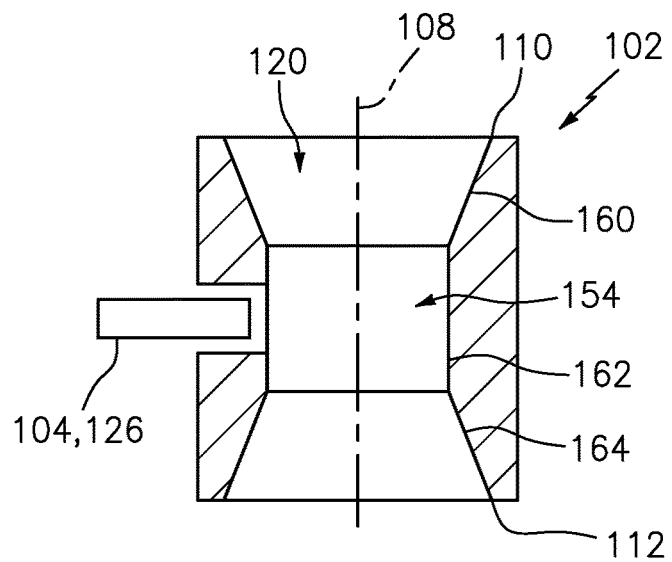
FIG. 10 is a side sectional illustration of a primary duct with a convergent-divergent inner flow passage configured with a fuel injector at a choke point.
Figure 11:
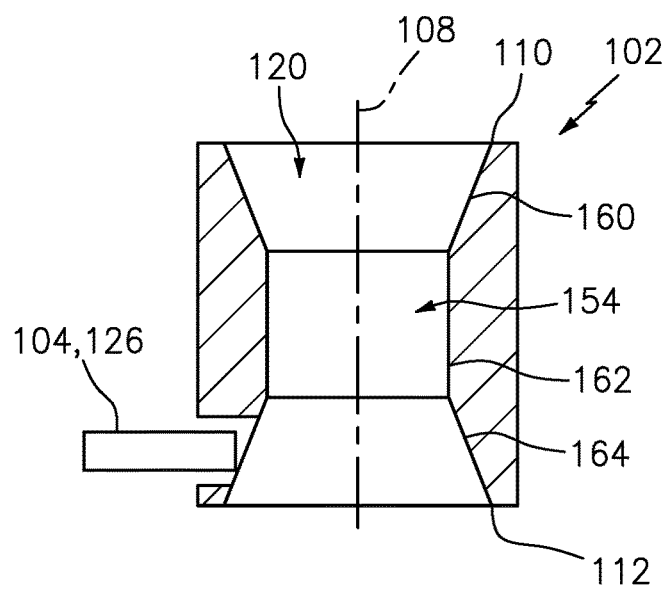
FIG. 11 is a side sectional illustration of the primary duct configured with the fuel injector downstream of a choke point.

In some embodiments, referring to FIG. 4, the fuel 148 is injected into the inner flow passage 120 at the choke point 154 as a result of the additional mass flow introduced into the inner flow passage 120. Thus, the choke point 154 of FIG. 4 is functionally defined. In other embodiments, referring to FIGS. 10 and 11, the choke point 154 may also or alternatively be physically defined by a geometry of the primary duct 102. The primary duct 102 of FIGS. 10 and 11, for example, is configured with a convergent portion 160, a throat portion 162 and a divergent portion 164; however, in other embodiments the divergent portion 164 may be omitted. With this configuration, the constricted size of the throat portion 162 forms a geometric pinch point within the inner flow passage 120 and thereby physically defines the choke point 154 within the inner flow passage 120. In the embodiment of FIG. 10, the fuel injector 104 is configured to direct the fuel into the inner flow passage 120 at the choke point 154. In the embodiment of FIG. 11, the fuel injector 104 is configured to direct the fuel into the inner flow passage 120 downstream of the choke point 154. The present disclosure, of course, is not limited to the foregoing exemplary primary duct geometries.

Figure 12:
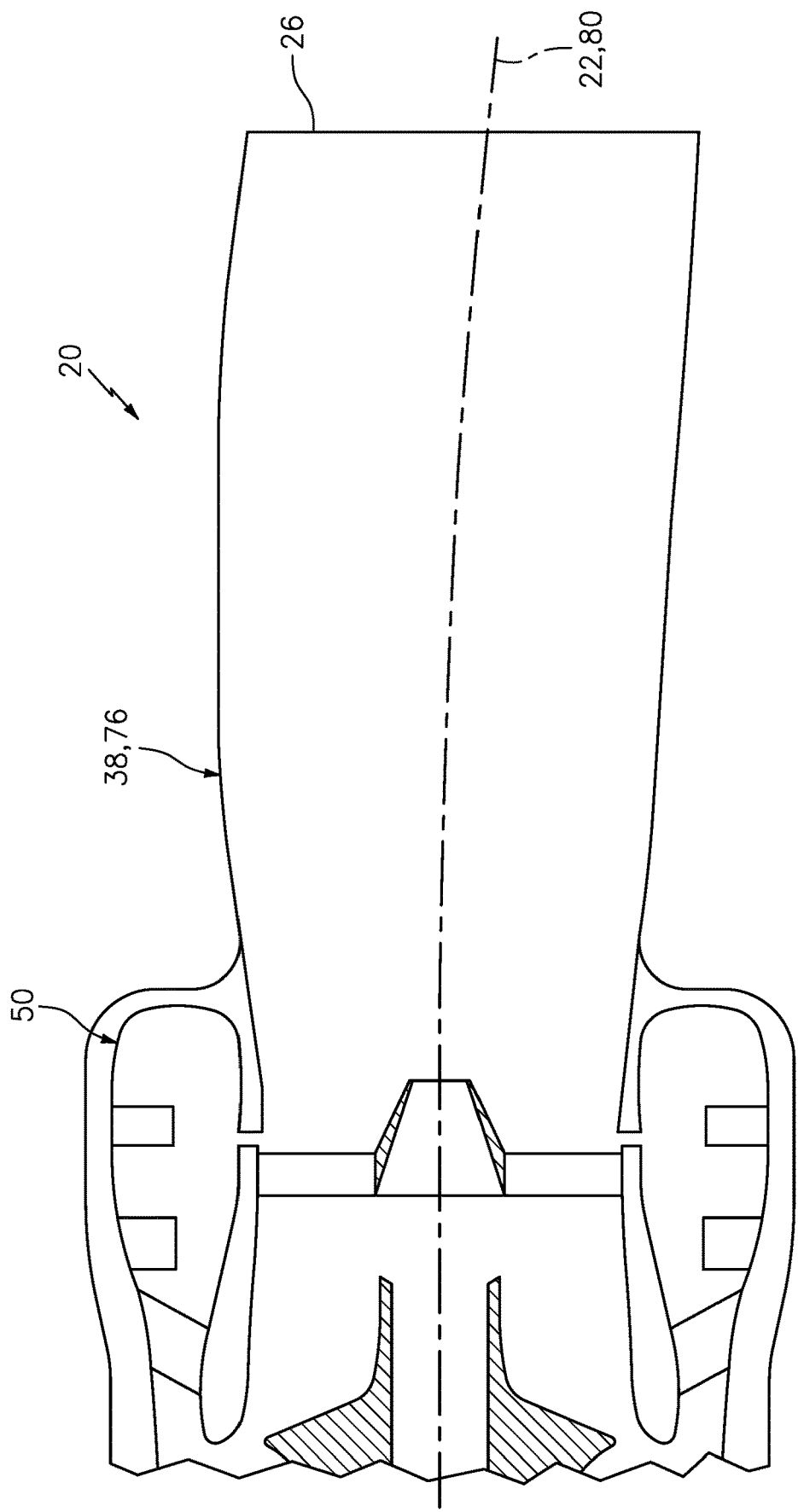
FIG. 12 is a side sectional illustration of an aft portion of the gas turbine engine configured with another supplemental thrust system and a flared exhaust duct.

In some embodiments, referring to FIG. 2, a width (e.g., diameter) of the exhaust duct may remain uniform as the exhaust duct 76 extends along the centerline 22, 80 to the airflow exhaust 26. In other embodiments, referring to FIG. 7, at least a portion (e.g., an aft and/or downstream portion) of the exhaust duct 76 may taper (e.g., the width may decrease) as the exhaust duct 76 extends along the centerline 22, 80 towards or to the airflow exhaust 26. In still other embodiments, referring to FIG. 12, at least a portion (e.g., an aft and/or downstream portion) of the exhaust duct 76 may flare outward (e.g., the width may increase) as the exhaust duct 76 extends along the centerline 22, 80 towards or to the airflow exhaust 26. Such a flaring may be enabled by axially shortening a length of the combustor 50 (e.g., as compared to the combustor 50 of FIG. 1).

Figure 13:
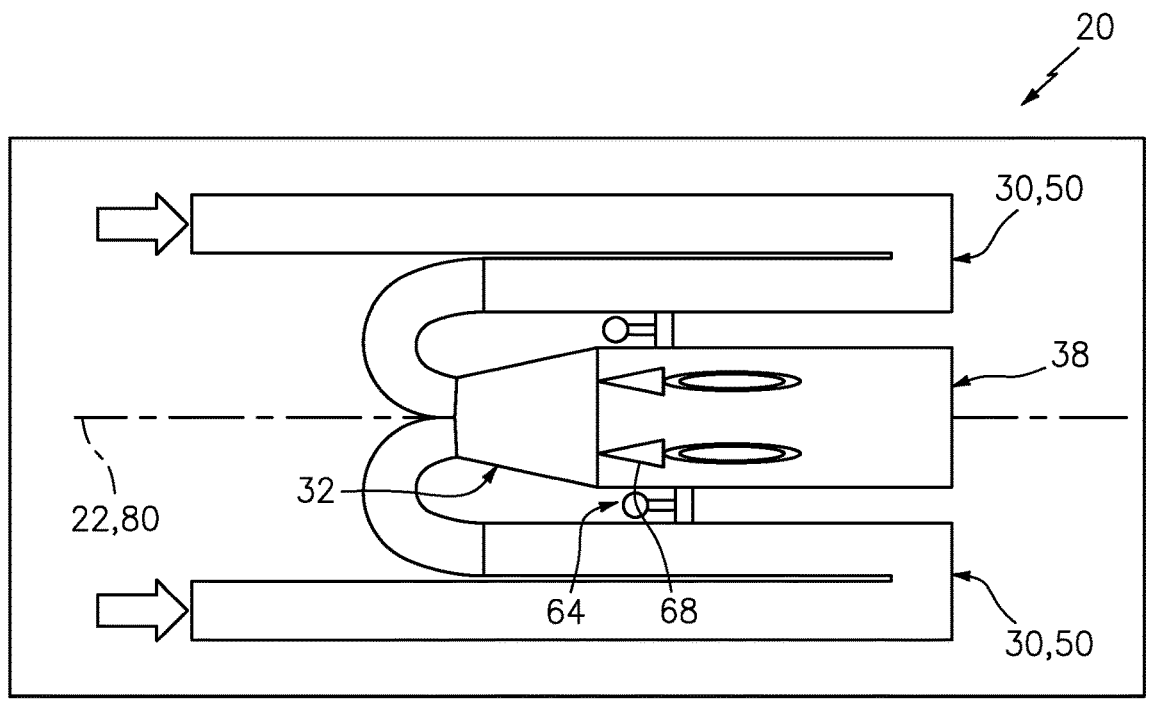
FIGS. 13-16 are schematic illustrations of alternative configurations for portions of the gas turbine engine configured with the supplemental thrust system.

In some embodiments, referring to FIG. 13, the supplemental thrust system 64 may be configured with an annular combustor 50 and feed (e.g., inject the fuel-gas mixture and the second gas stream into) a tubular (e.g., CAN) exhaust section 38. In the embodiment of FIG. 13, the combustor section 30 is radially outboard of and circumscribes the exhaust section 38. The exhaust section 38 is also fluidly coupled inline with and downstream of the combustor section 30.

Figure 14:
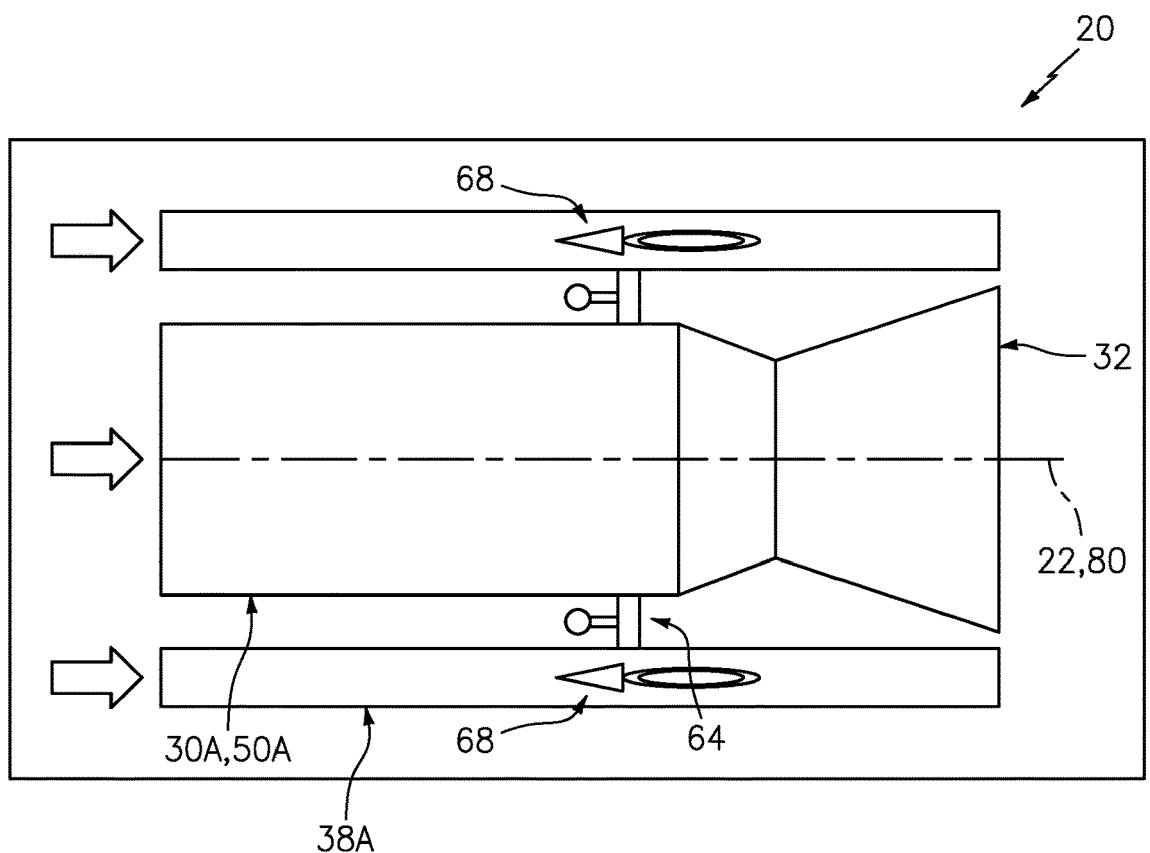

In some embodiments, referring to FIG. 14, the supplemental thrust system 64 may be configured with a tubular (e.g., CAN) combustor 50A and feed an airflow duct of an annular airstream section 38A. This airstream section 38A may flow/direct: (a) air extracted from a compressor and that bypasses a combustor; or (b) air received from an airflow inlet different than the airflow inlet 24 (see FIG. 1). In the embodiment of FIG. 14, the airstream section 38A is radially outboard of and circumscribes the combustor section 30A. The airstream section 38A is also arranged in parallel with or fluidly decoupled from the combustor section 30A.

Figure 15:
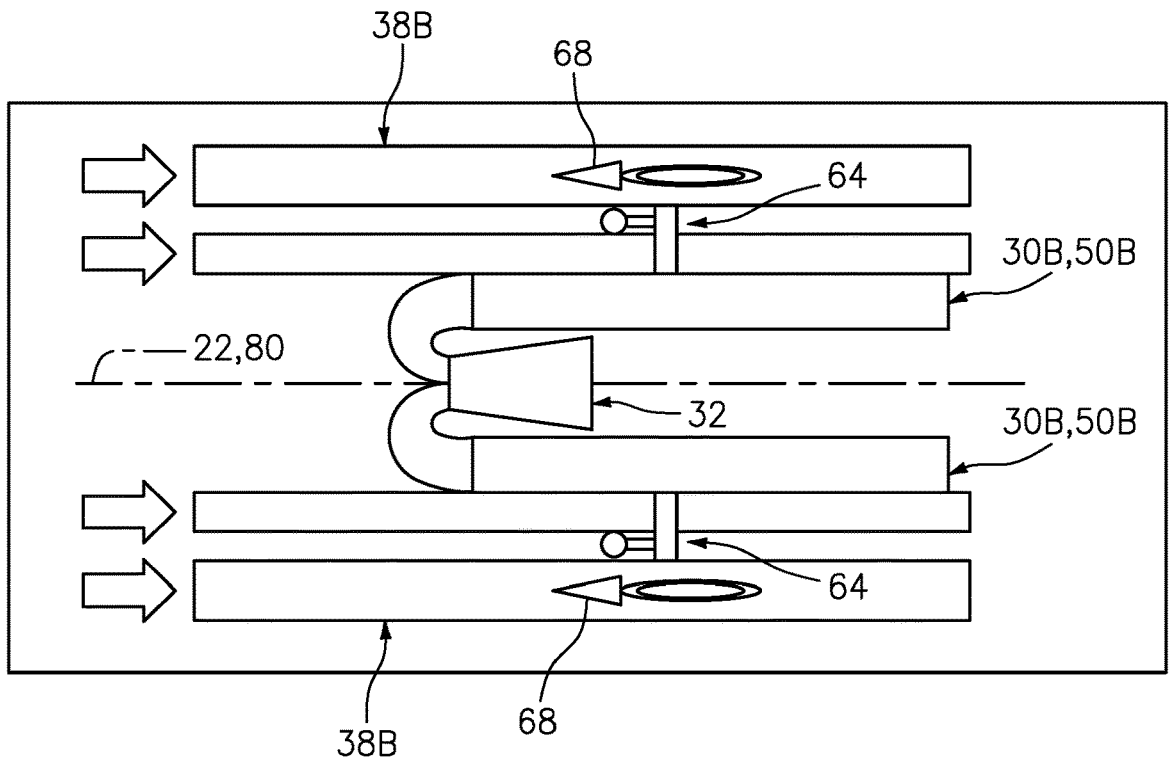

In some embodiments, referring to FIG. 15, the supplemental thrust system 64 may be configured with an annular combustor 50B and feed an airflow duct of an annular airstream section 38B. This airstream section 38B may flow/direct: (a) air extracted from a compressor and that bypasses a combustor; or (b) air received from an airflow inlet different than the airflow inlet 24 (see FIG. 1). In the embodiment of FIG. 15, the airstream section 38B is radially outboard of and circumscribes the combustor section 30B. The airstream section 38B is also arranged in parallel with or fluidly decoupled from the combustor section 30B.

Figure 16:
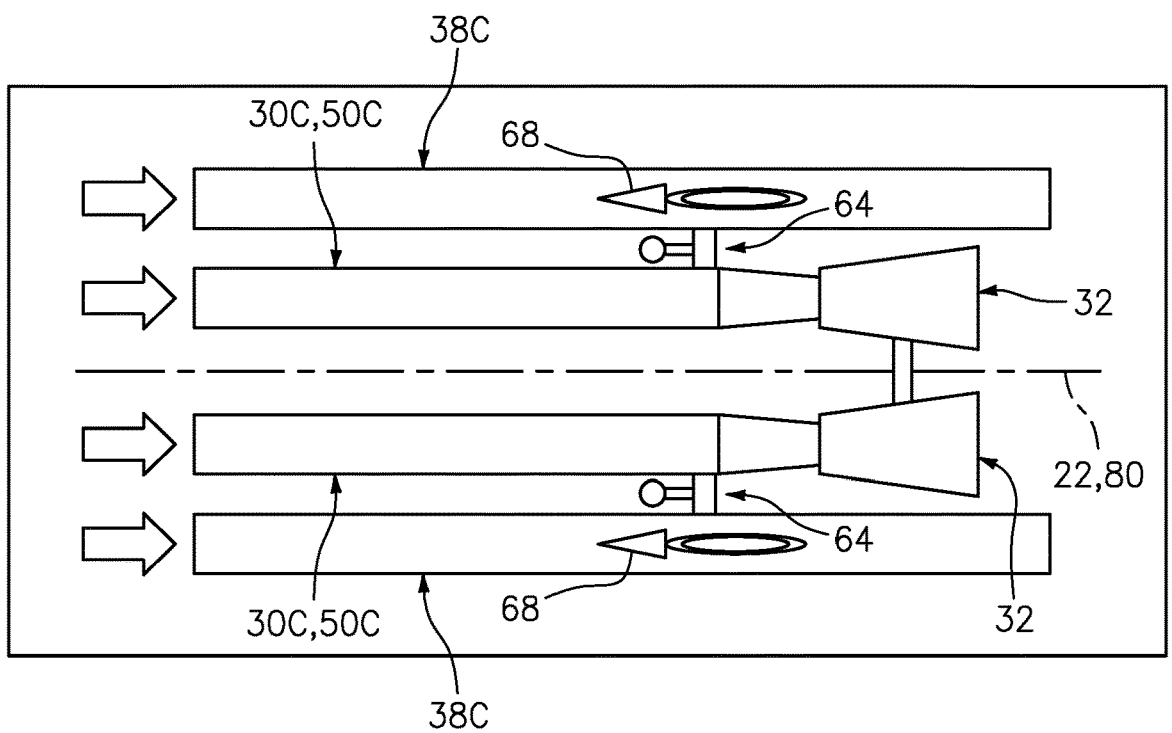

In some embodiments, referring to FIG. 16, the supplemental thrust system 64 may be configured with an annular combustor 30C and feed an airflow duct of an annular airstream section 38C. This airstream section 38C may flow/direct: (a) air extracted from a compressor and that bypasses a combustor; or (b) air received from an airflow inlet different than the airflow inlet 24 (see FIG. 1). In the embodiment of FIG. 16, the airstream section 38C is radially outboard of and circumscribes the combustor section 30C. The airstream section 38C is also arranged in parallel with or fluidly decoupled from the combustor section 30C.

While certain exemplary gas turbine engine 20 configurations are described above, the present disclosure is not limited to such exemplary gas turbine engines. For example, the gas turbine engine 20 may be configured as another type of axial flow or radial flow gas turbine engine. The gas turbine engine 20 may be configured as a direct drive gas turbine engine. The gas turbine engine 20 may alternatively be configured as a geared turbine engine, which includes a gear train that connects one or more rotors together such that the rotors rotate at different speeds. The gas turbine engine 20 may be configured with a single spool (e.g., see FIG. 1), two spools, or with more than two spools. The gas turbine engine 20 may be configured as a turbofan engine, a turbojet engine, a propfan engine, a pusher fan engine or any other type of turbine engine.

The primary duct 102 is described above as bleeding or otherwise receiving the first gas 146 from the combustion chamber 52 and the secondary duct 100 is described above as bleeding or otherwise receiving the second gas 150 from the diffuser plenum 58. The present disclosure, however, is not limited to such an exemplary first gas source or such an exemplary second gas source. For example, the second gas source may be a portion of the core flowpath 40 upstream of the diffuser plenum 58.

In some embodiments, two or more or all components of the static engine structure 34 may be formed together as a monolithic body. Herein, the term monolithic may described an apparatus which is formed as a single unitary body. At least the components 70, 72, 74, 96, 114 and 122, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a compressor section, a combustor section, a turbine section and a flowpath extending sequentially through the compressor section, the combustor section, the turbine section from an airflow inlet to a combustion products exhaust, the combustor section comprising a combustor with a combustion chamber, and a portion of the flowpath that is located downstream of the combustion chamber formed by a flowpath duct;
a fuel injector assembly including a primary duct with an inner flow passage that extends within the primary duct along a centerline of the primary duct, the fuel injector assembly configured to mix fuel with first gas within the inner flow passage to provide a fuel-gas mixture, the fuel injector assembly configured to direct a jet of the fuel-gas mixture into the portion of the flowpath that is located downstream of the combustion chamber, and the inner flow passage discrete from the flowpath; and
a secondary duct extending along a secondary duct centerline, the secondary duct configured to direct second gas into the flowpath about the jet of the fuel-gas mixture, the secondary duct including an outer flow passage that extends circumferentially about the inner flow passage; and
a first protrusion extending from the flowpath duct and projecting axially upstream and radially into the portion of the flowpath that is located downstream of the combustion chamber towards the centerline of the flowpath duct;
the combustor located radially outboard of and axially overlapping the fuel injector assembly and the portion of the flowpath that is located downstream of the combustion chamber;
the fuel injector assembly configured to bleed the first gas from the combustion chamber, the fuel injector assembly configured to direct the jet of the fuel-gas mixture into the portion of the flowpath that is located downstream of the combustion chamber at a first location that is circumferentially aligned with and downstream of the first protrusion; and
the centerline of the primary duct angularly offset from a centerline of the flowpath duct by an acute angle, and the centerline of the primary duct extending from the combustion chamber towards a forward end of the assembly;
the secondary duct centerline angularly offset from the centerline of the flowpath duct by an acute angle.

2. The assembly of claim 1, wherein the secondary duct is configured to direct the second gas as an annular stream into the portion of the flowpath that is located downstream of the combustion chamber such that the annular stream of the second gas circumscribes the jet of the fuel-gas mixture.

3. The assembly of claim 1, further comprising:
a diffuser including a plenum arranged fluidly along the flowpath between the compressor section and the combustor;
the combustor arranged within the plenum; and
the secondary duct configured to bleed the second gas from the plenum.

4. The assembly of claim 1, wherein
the fuel injector assembly is configured to receive the first gas at a first pressure; and
the secondary duct is configured to receive the second gas at a second pressure that is greater than the first pressure.

5. The assembly of claim 1, wherein
the fuel injector assembly is configured to receive the first gas at a first temperature; and
the secondary duct is configured to receive the second gas at a second temperature that is less than the first temperature.

6. The assembly of claim 1, wherein the fuel injector assembly is configured to direct the jet of the fuel-gas mixture into the portion of the flowpath that is located downstream of the combustion chamber as a sonic jet of the fuel-gas mixture.

7. The assembly of claim 1, wherein
the fuel injector assembly is configured to bleed a portion of the second gas from the secondary duct; and
the fuel injector assembly is configured to mix the portion of the second gas with the first gas and the fuel to provide the fuel-gas mixture.

8. The assembly of claim 1, wherein the flowpath duct is downstream of and fluidly coupled with the turbine section.

9. The assembly of claim 1, further comprising:
a second protrusion connected to the flowpath duct and projecting radially into the portion of the flowpath that is located downstream of the combustion chamber towards the centerline of the flowpath duct;
a second fuel injector assembly configured to direct a second jet of a second fuel-gas mixture into the portion of the flowpath that is located downstream of the combustion chamber at a second location that is circumferentially aligned with and downstream of the second protrusion; and
a second secondary duct configured to direct the second gas into the portion of the flowpath that is located downstream of the combustion chamber about the second jet of the second fuel-gas mixture.

10. The assembly of claim 9, further comprising a center body between and connected to the first protrusion and the second protrusion.

11. The assembly of claim 1, wherein the fuel injector assembly is configured to inject the fuel into the inner flow passage at or downstream of a choke point within the inner flow passage.

12. The assembly of claim 1, wherein
- the flowpath duct comprises an exhaust duct; and
- the portion of the flowpath that is located downstream of the combustion chamber comprises an exhaust flowpath.

\* \* \* \* \*